United States Patent
Nimberger et al.

(10) Patent No.: US 6,422,162 B1
(45) Date of Patent: Jul. 23, 2002

(54) METHOD AND APPARATUS FOR FLOW CONTROL OF NH$_3$

(75) Inventors: Spencer M. Nimberger; Kevin J. Cessac, both of Houston, TX (US)

(73) Assignee: PCI International, Ltd., Houston, TX (US)

( * ) Notice: Subject to any disclaimer, the term of this patent is extended or adjusted under 35 U.S.C. 154(b) by 0 days.

(21) Appl. No.: 09/576,629

(22) Filed: May 24, 2000

Related U.S. Application Data

(62) Division of application No. 09/087,515, filed on May 29, 1998, now Pat. No. 6,343,318.

(51) Int. Cl.$^7$ ............................................. A01C 23/00
(52) U.S. Cl. ................. 111/119; 73/861.76; 73/204.19; 73/861.77
(58) Field of Search ........................ 73/861.77, 861.76, 73/204.18, 204.19, 204.15, 204.16; 111/119, 118, 11; 137/486, 487, 487.5, 485, 78.1, 78.2; 239/155, 63; 222/1

(56) References Cited

U.S. PATENT DOCUMENTS

| | | | |
|---|---|---|---|
| 5,251,149 A | * 10/1993 | Williams et al. | ............ 364/510 |
| 5,320,133 A | 6/1994 | Nimberger | |
| 5,444,369 A | 8/1995 | Luetzow | |
| 5,456,121 A | * 10/1995 | Lew et al. | ................ 73/861.72 |
| 5,544,000 A | * 8/1996 | Suzuki et al. | ................ 361/139 |
| 5,627,325 A | * 5/1997 | Lew et al. | ................ 73/861.56 |
| 5,727,933 A | * 3/1998 | Laskaris et al. | ................ 418/2 |
| 5,808,197 A | * 9/1998 | Dao | ........................ 73/514.09 |

OTHER PUBLICATIONS

Portion of U.S. Patent No. 5,497,081.
Portion of U.S. Patent No. 4,487,077.
Portion of U.S. Patent No. 3,835,373.
Portion of U.S. Patent No. 5,544,533.
Portion of U.S. Patent No. 5,327,789.
Portion of U.S. Patent No. 5,187,988.

* cited by examiner

Primary Examiner—Benjamin R. Fuller
Assistant Examiner—Corey D. Mack
(74) Attorney, Agent, or Firm—Loren G. Helmreich; Browning Bushman P.C.

(57) ABSTRACT

The present invention provides an apparatus and method for accurately controlling the amount of NH$_3$ to be applied to a field by measuring the NH$_3$ flow rate without condensing or cooling the NH$_3$. The system includes a control station 12 on the vehicle with a tachometer 12A or a GPS system for providing a vehicle speed signal to a control panel 13. The control panel includes a toggle switch 17 for adjusting the opening or closing of a valve 52 in the flow line to regulate the flow through the system, although the control panel alternatively may automatically control the valve 52. The vehicle transports a tank 20 containing liquid NH$_3$ and a tool bar 30 for distributing the NH$_3$ to the soil. After flowing through the flow meter 40, 60, 130, the NH$_3$ is conducted to the soil through a series of hoses, fittings, a distributor, and tubing. The flow meter transmits a signal to the control panel, which is converted to a corrected flow rate signal in response to a fixed value vaporization correction factor. The temperature of the NH$_3$ is also measured to correct for density variations. An improved variable area meter 60, 130 uses a hall effect sensor 72 and a magnet 68 mounted on a rotatable vane shaft 70 to overcome problems with prior flow meters. The improved meter 60, 130 is ideally suited for measuring the fluid flow of a low temperature vaporization liquid, such as anhydrous ammonia, propane and butane.

13 Claims, 8 Drawing Sheets

METHOD AND APPARATUS FOR FLOW CONTROL OF NH$_3$

RELATED APPLICATIONS

The present application is a division of U.S. Ser. No. 09/087,515, filed May 29, 1998 now U.S. Pat. No. 6,343,318.

FIELD OF THE INVENTION

The present invention relates to a system for reliably measuring the flow rate of a low temperature vaporization fluid and for regulating fluid flow in response thereto. In a suitable application, the system of the invention may be used by a farmer while fertilizing crops to accurately disperse liquid anhydrous ammonia (NH$_3$) from a nurse tank. An improved and relatively low cost flow meter is provided ideally suited for measuring the flow rate of a low temperature vaporization fluid, such as anhydrous ammonia.

BACKGROUND OF THE INVENTION

Anhydrous ammonia (NH$_3$), which is 82% nitrogen, is applied to soil by farmers as a fertilizer. Farmers often use a nurse tank containing pressurized liquid NH$_3$ as the source. This tank is transported by the farm vehicle across a field while the NH$_3$ is distributed to the soil. An over application of NH$_3$ costs the farmer money, and an under application affects the crop. Moreover, since groundwater contamination attributable to NH$_3$ has become a more prominent issue (now regulated by some states), it is desirable to accurately control the flow of NH$_3$.

The crudest method of controlling the flow of NH$_3$ to the soil is to partially open a ball valve and roughly calculate the flow rate of NH$_3$ to the soil. This may be done by reading the percentage the tank is full with a meter on the tank. The farmer then makes a test run and, based upon speed, acreage and the amount of NH$_3$ used, he calculates flow. Several test runs followed by valve adjustment may be necessary to achieve the desired flow rate. If the tank pressure gauge indicates a change in pressure during the course of a day as a result of the NH$_3$ warming to the daily outdoor temperature, the flow rate has changed even though the valve position remains fixed. Accordingly, another test run may be needed. Needless to say, this method is crude and burdensome.

More accurate flow measurement for real time flow control of NH$_3$ presents a rather difficult problem. NH$_3$ has a low boiling point (low vaporization temperature). Pressure drops result in flashes (liquid turning to vapor) in the NH$_3$, and the created vapor makes the flow measurement inaccurate. Without an accurate measurement of the flow rate, the farmer cannot properly control the application of NH$_3$. A number of variables can cause the flow rate to change, including the ground speed of the farmer's vehicle, the temperature within the nurse tank and flow lines, soil density, the desired application, and the flow position of the regulator or valve (ranging from fully closed to fully open). Moreover, the farmer has no control over soil density or the temperature within the nurse tank, which can vary greatly during the course of a day. The prior art teaches that accurate measurement of the NH$_3$ flow rate requires condensation after the NH$_3$ is two phased (liquid/vapor). Heat exchanger and/or NH$_3$ liquifiers for performing this condensation purpose are expensive and require high maintenance.

Although others recognized the problem the farmer experienced in controlling the amount of NH$_3$ to be applied to the soil, the prior art has failed to devise a simple, accurate and inexpensive system for resolving the problem. For over 20 years, prior art systems attempted to obtain a more accurate measurement of the flow rate by taking the two phase NH$_3$, returning it to a single liquid phase, and then measuring the flow rate of this liquid. A continuing problem with such systems are their expense. Moreover, the condenser incorporated into the system never fully converts the two phase NH$_3$ back to liquid, and the condenser inherently uses a restriction in the flow path. The severity of the restriction increases during cold weather or low pressures. The cost of these systems for a typical farmer is commonly prohibitive, or is unjustifiable given the savings to be realized. The condensers are commonly designed for a specified flow rate, and at flow rates exceeding the specified flow rate, the condenser has difficulty converting the vapor to liquid, thereby reducing the accuracy of the flow measurement. In teaching that more accurate flow measurement required the taking of two phase NH$_3$ and returning to a single phase with a heat exchanger, the prior art devices taught away from the present invention.

In most prior art NH$_3$ dispensing systems, the flow meter is the most delicate component. Numerous types of flow meters have been devised, including both variable cross-sectional area flow meters wherein the cross-sectional flow cavity through the flow meter is indicative of flow rate, and turbine flow meters wherein the angular velocity of the turbine is proportional to the flow rate. With regard first to variable area flow meters, it is known that such flow meters may be devised such that the flow rate is related to the position of a member which defines the cross-sectional flow area through the meter at any point in time. Prior art variable area meters have several significant drawbacks, however, which have resulted in these meters not being acceptable for use in measuring the flow rate of anhydrous ammonia. Some of these meters include a sensor mounted on the vane shaft, but a seal is required between the flow chamber and the sensor. One patent disclosing such a meter is U.S. Pat. No. 3,835,373. The seal is subject to a highly hostile environment when the meter is used for fluids such as anhydrous ammonia, and accordingly this type of meter would not generally be considered acceptable for use on an anhydrous ammonia distribution system.

Another type of variable area meter utilizes a magnet mounted on a vertically suspended body and a hall sensor to provide an electronic output of the position of the suspended body and thus the flow rate through the meter. A system of this type is disclosed in U.S. Pat. No. 5,187,988. This meter would typically not be suitable for use in the application discussed above since the meter must be positioned in a true vertical position for proper flow measurement. Many fields commonly have rolling hills, and both the tractor and the equipment pulled by the tractor are thus not always moving truly horizontally. The flow meter discussed in this patent and the vertically suspended body in particular would also be highly susceptible to inaccurate readings and/or damage if subjected to vibration of the type common to farming equipment. This meter is also designed for a very low pressure application, and anhydrous ammonia is typically dispensed at medium or high pressures in excess of 250 psi.

Other variable flow area type devices are disclosed in U.S. Pat. Nos. 5,497,081, 5,444,533 and 5,327,789. Many types of these flow measurement devices are frequently designed to operate in the vertical position. Complicated sensor assemblies are frequently employed to detect the position of the flow area defining member. These complicated detector and sensor assemblies are very costly, and are not highly reliable when used in the rugged environment required for farming equipment. Other variable area meters employ complicated flux concentrators. Mechanical calibration or remote read-out devices which are generally unsuitable for anhydrous ammonia applications are also commonly associated with variable area flow meters, as disclosed in U.S. Pat. No. 4,487,007. Farmers want a meter which has a low cost and which is not complicated or difficult to calibrate. As explained above, many prior art variable area flow meters must be positioned vertically to be accurate, and this restriction is unacceptable to $NH_3$ applications. U.S. Pat. No. 5,444,369 discloses another type of variable area meter. Various pole pieces must be precisely positioned in order to provide a desired linear output between the flow and the electronic output from the hall device. Prior art meters which rely upon a variable area concept for measuring flow have thus long been considered too expensive, too complicated, too delicate, and too limiting for anhydrous ammonia use.

Almost all flow meters currently in commercial use for measuring the flow rate of anhydrous ammonia applied from the nurse tank to the field are of a type which employ a rotating turbine, wherein the rotational output of the shaft is proportional to the flow rate. These turbine-type meters common employ a magnetic pick off on the shaft, so that each rotation of the shaft produces an output signal, the number of pulses or signals generated during any period of time is thus used to determine the flow rate of anhydrous ammonia through the meter. Turbine-type meters are quite expensive, but are generally considered rugged and do not require precise positioning to provide an output. Unfortunately, a significant disadvantage of such meters when used for measuring the flow of fluids which are easily vaporized is that the meters are frequently damaged when the liquid nurse tank runs dry.

The absence of liquid flowing through the turbine meter and the presence of only vapors commonly damages either the meter or the other system components whose operation is affected by the meter output. Problems have thus commonly arisen with respect to the use of the turbine meter in prior art anhydrous ammonia distribution systems. When the $NH_3$ nurse tank runs empty, high velocity vapor passing through the turbine meter causes the impeller to spin at extremely high speeds. The meter bearings typically quickly fail or develop excessive wear, thereby causing flow reading errors. This cause for failure is present in any system with a turbine meter, even if the system is equipped with a heat exchanger to remove vapor. The heat exchanger requires liquid input to perform its intended operation, and when the nurse tank runs empty, only vapor flows through the heat exchanger and the turbine meter. Although turbine meters are thus widely used to measure the flow rate of anhydrous ammonia being applied by a farmer, these meters have high repair and maintenance costs.

The disadvantages of the prior art are overcome by the present invention, and an improved system for reliably measuring the flow rate of low temperature vaporization fluids, such as anhydrous ammonia, are provided so that flow may be reliably regulated in response thereto. The flow meter of the present invention is particularly well suited for use in measuring the flow rate of anhydrous ammonia which is applied to the field from a portable nurse tank.

SUMMARY OF THE INVENTION

The present invention may be used for controlling the flow of a low temperature vaporization liquid, such as $NH_3$. The system is simple to install, easy to use and very accurate. The total gallons dispersed by the former agrees with the weigh scales within a very low percentage, typically about 1% or less. The desire to over applicate is eliminated with this system, thereby reducing the farmer's fertilizer costs. Application rates of 220 pounds of $NH_3$ per acre may be obtained using a 30 ft. tool bar at 5.5 miles/hr. with only 55 psi tank pressure. Since a heat exchanger and/or condenser is not required, the $NH_3$ flow path has no added restrictions and more $NH_3$ may be reliably applied in cold weather (early in the season, in the morning, etc.). The meter of the present invention preferably uses a variable area to determine flow rate and is immune to the high velocity vapor flow rates caused by a tank running empty. The variable area meter is simple, reliable, has excellent repeatability, and is rugged and trouble free. The system may include a vehicle having a control station with a tachometer, a throttle for adjusting the velocity of the vehicle, and a flow rate display. The control station may also include a toggle switch for adjusting the opening or closing of a valve in the flow line to regulate the flow through the system.

The present invention provides an apparatus and method for accurately controlling the amount of $NH_3$ to be applied to a field. A vane is mounted in the flow stream and a spring holds the vane toward the fluid inlet. The measuring cavity in the meter is smaller on the inlet side and increases linearly toward the outlet side. As flow increases, the vane is pushed toward the outlet by the liquid flow until the force from the liquid is equal to the torque on the vane applied through the spring. The position of the vane is measured to determine the flow rate. A sensor in the liquid stream measures the liquid temperature to correct for density changes as the $NH_3$ warms throughout the day. The flow rate may be measured when the $NH_3$ is close to the nurse tank. Some vaporization typically has occurred prior to flow measurement, but the system provides a compensation to correct this error caused by vapor during flow measurement.

In a typical application, the vehicle may transport a tank containing $NH_3$ and a tool bar for distributing the $NH_3$ to the soil. A flow meter is mounted in the flow path downstream of the nurse tank withdrawal valve. After flowing through the flow meter, the $NH_3$ is conducted to the soil through a series of hoses, fittings, a distributor, and tubing. The flow meter transmits a signal converted to a flow reading which is displayed on the control panel. The farmer is able to view and control the rate of application from the cab with high accuracy.

It is an object of the present invention to provide an improved system for measuring the flow rate of fluids and regulating flow rate in response thereto. The system of the present invention is particularly well suited for measuring the flow rate of low temperature vaporization liquids, such as anhydrous ammonia. The system of the present invention may thus be used in exemplary application by a farmer of fertilizing crops to accurately disperse liquid anhydrous ammonia from a nurse tank to the field.

It is another object of the present invention to provide an improved flow meter suitable for use in measuring the flow rate of a low temperature vaporization liquid. The flow meter is highly reliable and rugged, and may be manufactured and maintained at a relatively low cost.

The method of the invention may be used for controlling the amount of $NH_3$ to be applied to a field from a nurse tank located on a vehicle. $NH_3$ may be withdrawn through a valve located at an outlet of a tank, and the flow rate of the $NH_3$ measured with a flow meter positioned downstream from the withdrawal valve. By comparing the measured $NH_3$ total flow measured by the flow meter to the actual $NH_3$ withdrawn from the nurse tank over a time interval, a correction factor may be devised for vapor in the measured $NH_3$. In response to the measured flow rate and the derived correction factor, the actual $NH_3$ flow rate may be determined at a control station located on the vehicle, and the amount of $NH_3$ applied to the field adjusted in response to the determined flow rate.

It is an object of the invention to provide an improved system for controlling the amount of $NH_3$ to be applied to a field from a nurse tank located on a vehicle. A control station on the vehicle is used for determining a ground speed of the vehicle. A flow meter downstream from the nurse tank output a flow rate signal to the control station, and a temperature sensor senses the $NH_3$ temperature and outputs a temperature signal to the control station. Flow distribution lines downstream from the flow meter channel $NH_3$ to a tool bar carried by the vehicle. The control station includes a constant valve correction device, such as a computer, for correcting the flow rate signal from the meter and the temperature signal from the temperature sensor. An output signal adjusts a valve located along the flow distribution line to regulate the flow of $NH_3$.

It is another object of the invention to provide an improved variable area flow meter positionable along a flow line for sensing the flow rate of fluid through the flow line and outputting a signal in response thereto. The flow meter includes a housing having an internal cavity with a fluid inlet and a fluid outlet each for interconnection with the flow line, and a vane member rotatable about a shaft axis and moveable within the internal cavity in the housing to vary the flow area as a function of the flow rate through the meter. A magnet is fixedly positioned on the vane member within the cavity and rotatable with the vane member about the shaft axis. A spring or other biasing member biases the vane member in a preselected position. A sensor fixed to the housing exterior of the cavity outputs a signal in response to the position of the magnet with respect to the housing, with the signal being indicative of the rotational position of the vane member and thus the flow rate through the housing.

It is a feature of the present invention that the system may be used for measuring the flow of low temperature vaporization fluids without the use of a heat exchanger or other liquifier, thereby significantly reducing the system cost. Yet another feature of the invention is to provide a flow meter for use in a flow temperature vaporization system wherein the meter is not highly susceptible to damage when the source of liquid to the meter runs dry.

Yet another feature of the present invention is an improved system for regulating the flow rate of a low temperature vaporization fluid, wherein the compensation system allows the system to accurately measure the flow of liquid without the meter being positioned closely adjacent the liquid storage source. Yet another feature of the invention is a flow meter which need not be monitored at the particular position or have a particular orientation to provide a reliable output. The flow rate of the $NH_3$ may be measured after the $NH_3$ passes through a hose and a valve connected to the withdrawal valve of the nurse tanks. The amount of $NH_3$ to be applied to the field may be controlled by adjusting either or both the flow rate of the $NH_3$ or the ground speed of the vehicle.

Another feature of the invention is that the flow meter is not susceptible to damage due to high velocity vapor flowing through the meter. The flow meter of the present invention may provide a flow rate output which is compensated for temperature and thus varying density of the fluid, and also compensates for vapor in the fluid which is present when the flow measurement occurs.

It is an advantage of the present invention that the variable area meter is not adversely affected by hysterisis which is commonly associated with meters which utilize a magnetic coupling. The hall effect sensor is preferably used to output a signal indicative of the position of a vane shaft, thereby overcoming problems associated with sensors which use an LVDT or potentiometer. The output from the sensor varies in response to the position of a unitary magnet having a curvilinear configuration and fixedly positioned on the shaft of the vane member.

Yet another advantage of the system according to the present invention is that the meter is highly reliable and its operation is not adversely affected by debris in the flowing fluid.

Still another advantage of the present invention is that a GPS system may be used to monitor the speed of the vehicle and thereby accurately control the amount of the anhydrous ammonia applied to the given size of the field.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
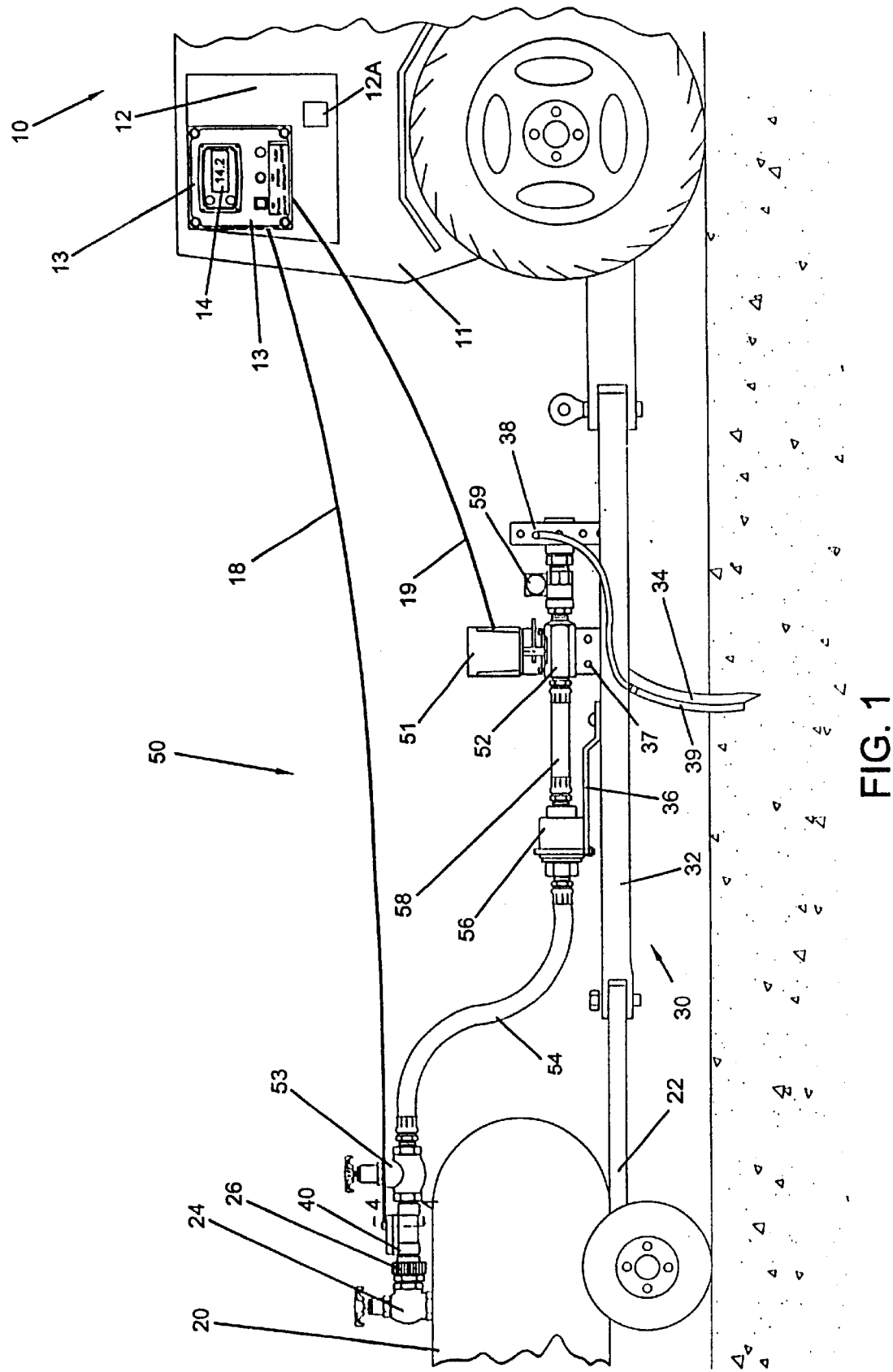
FIG. 1 is a schematic view of one embodiment of an $NH_3$ distribution system according to the present invention.
Figure 2:
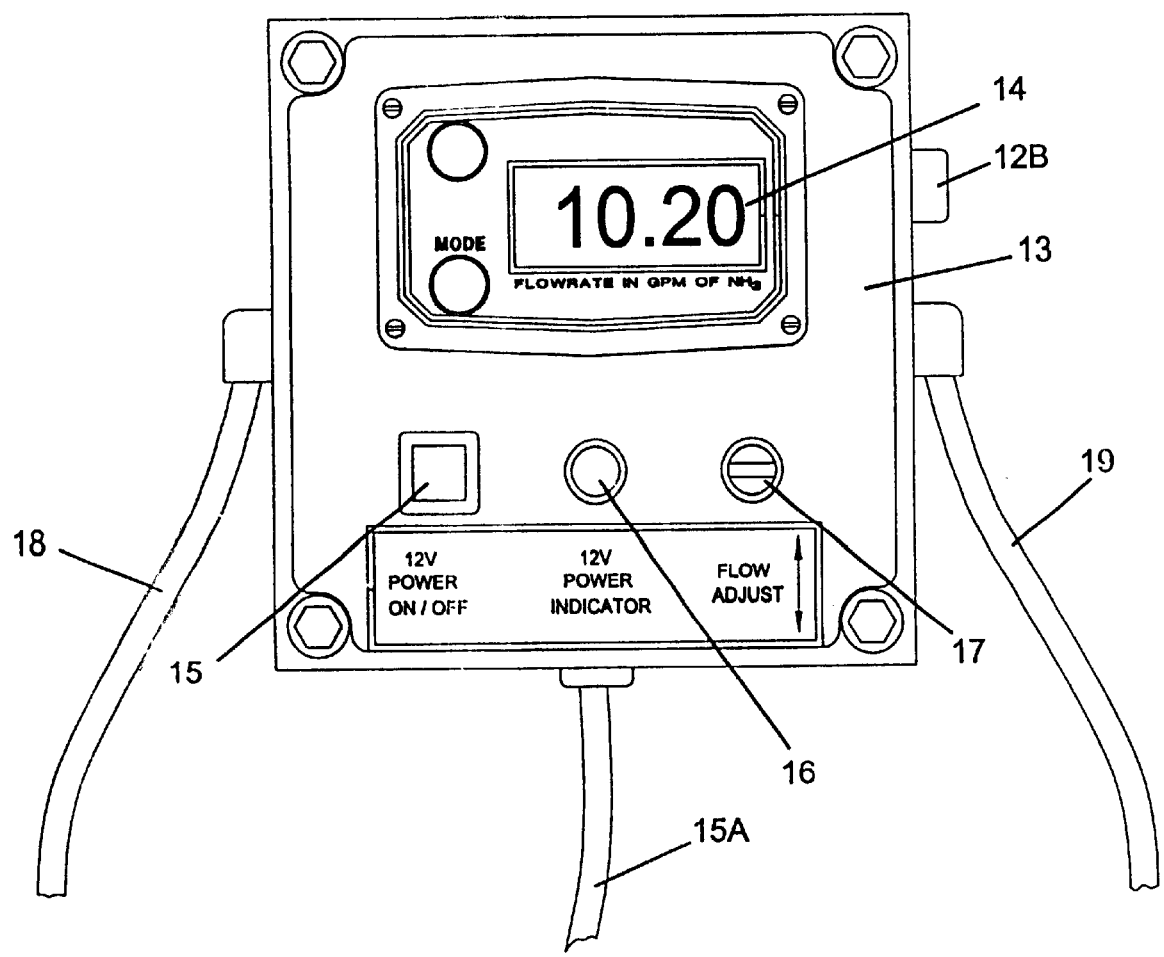
FIG. 2 is an elevational view of the control panel generally shown in FIG. 1.

Referring to FIG. 1, the present invention may include a vehicle 10 such as a tractor, a nurse tank 20, a tool bar 30, a flow meter 40, flow distribution system 50 and a flow regulator 52. Vehicle 10 includes a cab 11 with control station 12 and a control panel 13. The control station 12 includes a conventional analog or digital engine tachometer 12A and an application chart discussed subsequently. The tachometer 12A may be linked to any suitable ground speed indicator device such as, for example, the GPS system also discussed subsequently. Referring to FIG. 2, control panel 13 may include a flow rate display 14, on/off button 15, an on/off indicator light 16 and a two-way toggle switch 17 for actuation of flow regulator 52. Line 18 runs from flow meter 40 to circuitry within the control panel for flow rate display 14. Line 19 runs from the circuitry toggle switch 17 to gear motor 51 for actuating flow regulator 52. The circuitry on/off button 15 may be connected to the tractor battery (not shown) through line 15A via the cigarette lighter (not shown).

The farmer may use an application chart to determine the NH$_3$ flow rate necessary to achieve the desired application of NH$_3$ per acre. An exemplary application chart may have an x axis representing pounds of NH$_3$ per acre and a y axis representing vehicle speed in miles per hous. The intersection of the x and y axis on the chart shows values in gallons per minute in liquid NH$_3$. Each chart may be adapted for a particular length of the tool bar 30. Individual charts may be used for each of the variety of tool bar swaths that are available on the market. In a preferred embodiment, a chart is not required for this purpose, and the desired NH$_3$ flow rate is determined by a computer in the control panel based on the information input by the farmer. The mode of the flow rate display 14 can be changed to display information stored in totalizers (not shown), wherein one of such totalizer is resetable.

Nurse tank 20 may be carried on its own frame 22. Nurse tank 20 is of a design known in the art, and is normally fitted with a dip tube (not shown) which runs to the bottom of the tank 20 for drawing the NH$_3$ from the tank 20, a withdrawal valve 24 fluidly connected to the dip tube, and a pressure gauge (not shown). A speed nut or hose connection piece 26 is conveniently located on the discharge port of the withdrawal valve 24.

Tool bar 30 is of a design well known in the art which is transported by vehicle 10. Tool bar 30 includes a frame 32 and a plurality of knives 34 for tilling the soil. A portion of the flow distribution system 50 described below is mounted on the tool bar frame 32 with bracket 36 for safety coupler 56, and bracket 37 for flow regulator 52. The number of knives 34 and the swath of the tool bar 30 may vary.

Figure 4:
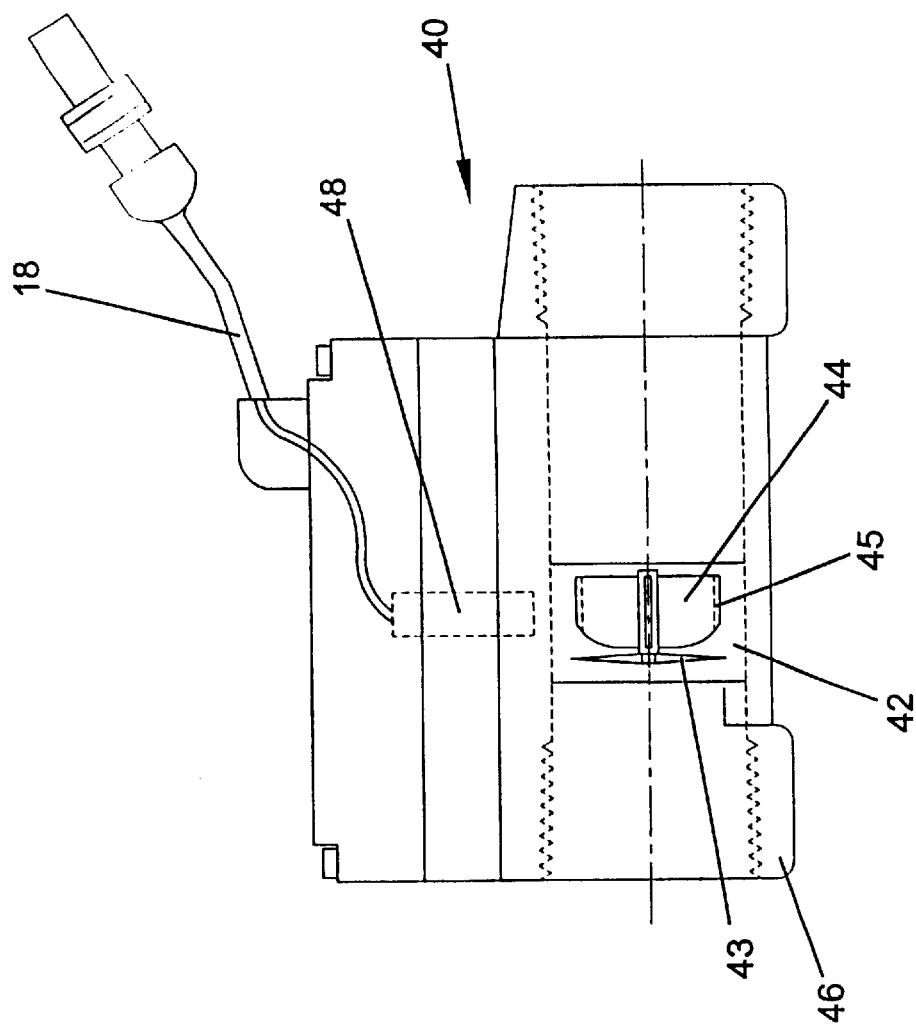
FIG. 4 is a side view of the flow meter shown in FIG. 3.
Figure 3:
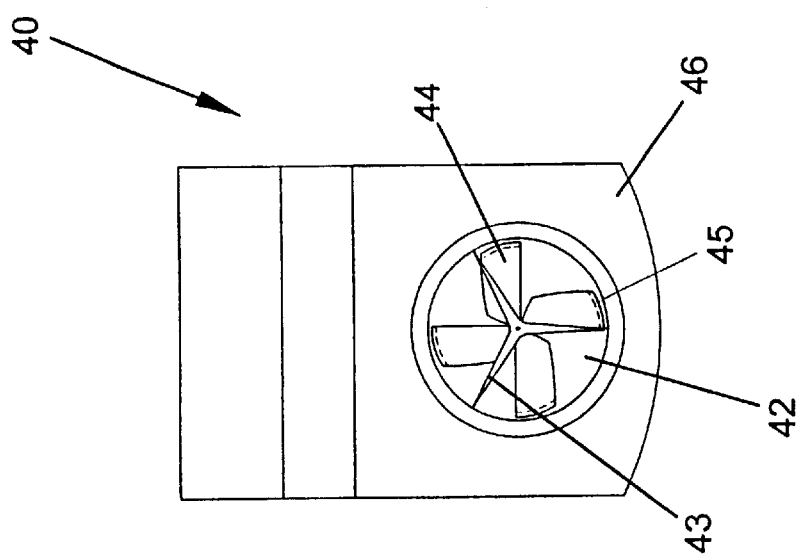
FIG. 3 is an end view of a turbine type flow meter generally shown in FIG. 1.

Referring to FIGS. 1, 3 and 4, in a less preferred embodiment of the invention, the flow meter 40 may be a commercially available turbine meter calibrated for NH$_3$. The rotor 42 is mounted in casing 46 by braces 43. Vanes 44 of rotor 42 are driven by the moving NH$_3$ fluid. Casing 46 is adapted at one end for connection to a connecting piece of the flow distribution system 50, such as speed nut 26. Vanes 44 have a magnetic tip 45. Casing 46 houses a magnetic pickoff 48 which lies in the radial plane of rotor 42 and is adapted for connection to line 18. Pulses are generated through line 18 by induction as rotor 42 spins. The trailing end of the flow meter 40 is connected to the flow distribution system 50. It is possible to place the flow meter 40 ahead of withdrawal valve 24 or within the tank 20 by retrofitting currently available systems. This would further decrease the pressure drop prior to reading the flow rate, although such a retrofitting is expensive and typically is not desired.

Figure 5:
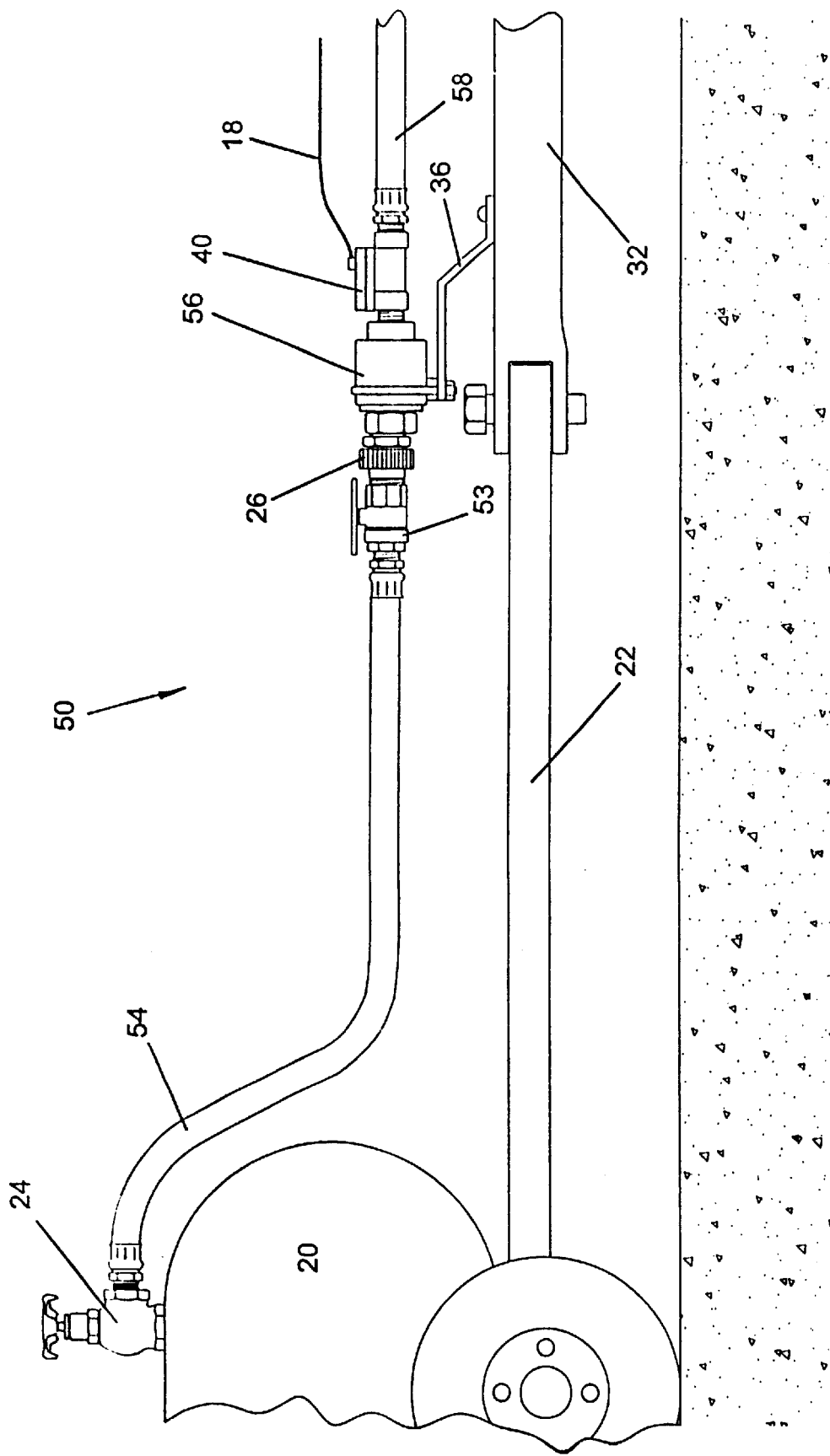
FIG. 5 is an enlarged view of another embodiment of the portion of hte system shown in FIG. 1.

The flow distribution system 50 may comprise any of a number of arrangements, and the flow regulator 52 may be placed anywhere convenient downstream of flow meter 40. Referring to FIGS. 1 and 5, two embodiments are shown. In addition to the flow meter, the flow distribution system typically includes a hose end valve 53, a hose 54, a safety coupling 56, flow line 58, control valve 52, and on/off valve 59, a distributor 38 and tubing 39 going to each knife 34.

Referring to FIG. 1, a hose end valve 53 (as shown a globe shutoff valve) connects to flow meter 40. Hose 54 runs to pull away safety coupling 56. Because of the toxic nature of NH$_3$, pull away safety coupling 56 is required. The design of pull away safety coupling 56 is known to one of ordinary skill in the art and in principle functions similar to an air chuck. Such a safety coupling is a substantial flash point for the generation of vapor. Flow line 58 runs from pull away safety coupling 56 to flow regulator 52. An additional valve 59 may be placed in flow distribution system 50. This valve 59 is an on/off valve and may be manually but is typically hydraulically controlled. The general design of distributor 38 is known to one of ordinary skill in the art and functions to distribute NH$_3$ to tubes 39. The tubes 39 extend along the framework 32 and down to each of the knives 34 where the NH$_3$ is distributed to the soil.

FIG. 5 represents another embodiment of the flow distribution system 50 where hose 54 stays with the nurse tank 20. The farmer may purchase or rent the nurse tank 20 connected to the withdrawal valve 24, which is in turn connected to hose 54 which runs to a breakaway coupling 56. The system as shown in FIG. 5 includes a low restriction valve, such as the full opening ball valve 53, and ahose connection piece 26 spaced between valve 53 and coupling 56. The turbine meter 40 is downstream from the breakaway coupling 56. Flow line 58 runs from meter 40 to the next component in the flow distribution system 50, which may comprise either a flow regulator 52 or a valve 59.

The present invention is effective for controlling the amount of NH$_3$ to be distributed to the soil. Referring back to FIG. 1, as the NH$_3$ is withdrawn from the nurse tank 20, it experiences nil pressure drop through the dip tube and a very small pressure drop through the withdrawal valve 24 (nurse tanks 20 are normally fitted with a Y-pattern withdrawal valve having a "smooth" curve rather than a "hard" curve such as that within like a typical globe valve) and through the speed nut 26. The NH$_3$ flowing through the flow meter 40 (which also has a very small pressure drop) is thus primarily but generally not totally in the liquid state. As the NH$_3$ continues through the system, it experiences substantial pressure drop through the pull away safety fitting 56, an additional pressure drop through the flow line 58 and a varying pressure drop through the flow regulator 52, depending upon whether it is partially closed (large flash) or fully open (smaller flash) prior to flowing into the distributor 60. During each pressure drop, the NH$_3$ flashes and becomes more two phased.

Referring to FIG. 5, the flow path is similar except the NH$_3$ flows through hose 54 prior to flowing through the hose end valve 53 and the flow meter 40. All components downstream of withdrawal valve 24 and upstream of flow meter 40 may be full port, low restriction devices or components, to induce a minimal pressure drop. Flow sensing for flow rate measurement may thus occur before substantial flashing of the NH$_3$ occurs.

Flow meter 40 ideally may measure the flow rate when the NH$_3$ is primarily a liquid. As explained subsequently, however, some vapor will likely be present in the flow even if the meter 40 is positioned very close to the nurse tank. This vapor causes a significant error in the flow measurement from the meter 40, and is corrected as discussed below. The raw or uncorrected signal from flow meter 40 is transmitted to flow display 14 where the operator reads a corrected flow rate measurement in gallons per minute. The operator then reads ground speed and determines how many pounds of nitrogen per acre are being distributed to the soil. The operator then adjusts his speed or adjusts the flow rate to control the amount of nitrogen being distributed to the soil.

As discussed above, vapor in the NH$_3$ liquid causes a shift in the flow reading and, if not corrected for or removed, can lead to significant errors. A key feature of the system is the ability to correct for vapor in the liquid. To accomplish this, the controller applies a constant or fixed value compensation correction factor (to correct for vapor in the system at the meter 40) and a temperature compensation factor (to correct for fluid density variation as a function of fluid temperature) and then calculates the actual flow based upon these factors.

The first step in calculating the vapor compensation factor is to apply a significant amount of $NH_3$ to determine the system error for a particualr flow distribution system. Regardless of theoretical similarities, it has been found that this correction signal is best determined from actual tests conducted on each particular distribution system. The vapor compensation correction value remains a constant for that system. Before applying the first tank, the operator ensures that the Total Counter (total flow measurement in gallon) is cleared to zero. The Total Counter thus keeps track of the number of gallons applied as determined by the flow meter. When applying this first calibration tank, it is important to stop the $NH_3$ application before the tank gets too low and excessive vapor flows through the meter.

A comparison of the controller Total Counter to the actual gallons utilized provides the information required to determine the vaporization compensation factor for the particular system in use. In the following example, Initial Tank Weight In was 4582 lbs and Final Tank Weight was 256 lbs, so that Total $NH_3$ Used was 4326 lbs. Assume 5.12 lbs per gallon for $NH_3$, then the Total Gallons Used=4326÷5.12=845 gallons. If the Total Counter shows 900 gallons used, the flow rate error is determined by (900−845)÷900=0.061 and 0.061×100=+6.1%. Meter Compensation thus is −6.1% for this flow distribution system, and this correction value is entered into the controller.

The controller, mounted inside the tractor cab, allows the operator to monitor and adjust the $NH_3$ flow rate. The controller also monitors the raw flow rate and $NH_3$ temperature to initially determine the raw flow rate corrected for density due to changing temperature. The measured flow rate is then offset or corrected with the fixed vaporization compensation factor for that particular flow system to compensate for vapor to determine the actual corrected flow. The actual flow is compared to the desired flow and adjustments are made to the control valve.

Control of the anhydrous flow rate may be done with a totally independent system. Flow regulator 52 may comprise a special rotating plug valve used for flow control. This flow control valve 52 may be actuated by a 12 volt dc high ratio gear motor 51 as shown in FIG. 1. On/off and directional control of the gear motor may be performed in the cab with the on/off button 15 and spring return reversing toggle switch 17. The farmer provides the link between the flow measurement system and the powered regulator 52 of the flow control system. Flow regulator 52 may be adjusted by two way toggle switch 17 to "trim up" or "trim down" the valve. If the valve is fully open and the farmer can't get enough flow (typically when it's very cold), he must slow down to achieve the desired application rate.

The controller (control panel) can be upgraded to include a GPS receiver to determine the tractgor true ground speed. An accurate speed is critical in maintaining the exact desired flow rate and can significantly improve application accuracy. The GPS system measures true ground speed, maintains high accuracy at all speeds, and is unaffected by vibration, waving weeds, or field debris that interfere with radar speed systems. The GPS system is also simple to install and setup may be achieved at a low cost.

A Global Positioning System (GPS) is based on satellite ranging. A position on earth is determined by accurately measuring the distance from a group of satellites in space. The distance to a satellite is determined by measuring how long a radio signal takes to reach the receiver. By using the distance measurement from a minimum of four satellites, and knowing the locations in space of the satellites, the GPS can triangulate a position on earth including altitude. To determine speed-over-ground, two positions may be measured exactly one second apart. The distance in feed between the two positions is the speed in feet per second. The control panel 13 displays the speed in miles per hours.

When the controller 13 is first turned on, the system may perform several internal tests to verify that the equipment is functioning properly. The display will alert the operator of any possible problems. As part of the power on sequence, some of the operator programmable values may be read from the controller's non-volatile memory and briefly displayed to allow the operator to review the present settings. A GPS antenna (shown as 132 in FIG. 9) may be mounted on the vehicle cab, and the GPS unit may output a signal which is received at connection 12B as shown in FIG. 2. After loading the current settings from memory, the controller checks to see if a GPS receiver is installed. If a GPS signal is found, the controller will wait for the GPS to finish downloading information from satellites. This process may take from 20 seconds to 3 minutes depending on how much information the GPS needs to download and how long the controller has been turned off.

If no GPS signal is found, the fixed tractor speed may be loaded from memory and displayed on the controller screen. The fixed tractor speed may be used as the vehicle speed when the GPS is not installed or not working. If the controller is not equipped with GPS for speed measurement, this is the speed that the operator may drive the tractor. With the GPS installed, the fixed tractor speed is commonly only used if the GPS signal is lost or the GPS fails. Tractor speed may be used to determine the flow rate as well as acres covered. To adjust the fixed tractor speed, the operator toggles the SETUP switch until the SET FIXED TRACTOR SPEED choice is displayed. For a known tool bar width and desired application rate, the farmer can choose among many tractor speeds and flow rate combinations. When a tractor speed is chosen, it is then matched to the flow rate in GPM of $NH_3$ liquid required to obtain the desired fertilization.

In the field, the control valve 52 is opened or closed from the cab 11 to obtain the required flow rate as observed on the display. If soil conditions or tank pressure varies significantly, the flow rate will change but can easily be adjusted back to the desired rate. Thus the farmer has continuous and verifiable control of the anhydrous application. The control valve 52 thus adjusts the flow to maintain a consistent application rate. The valve position may be controlled by a DC gear motor 51. A position indicator may be used to provide a quick visual indication of how far open or closed the valve is at any time. The controller is intended to make automatic adjustments to the valve to maintain the desired flow rate. The valve 52 can also be adjusted manually at any time by toggling the flow switch 17 on the controller up to increase the flow rate or down to decrease the flow rate. Using the flow switch 17 also switches the controller to manual control. In manual, the controller will not make automatic adjustments to the control valve. The operator may toggle CANCEL to return to automatic control. The control valve 52 is designed for flow control only, and is not designed to shut-off tight. The control valve 52 thus should be used in conjunction with a shut off valve.

The controller 13 can be setup to alarm if the flow drifts too far from the desired flow rate. If the rate error is greater than the ALARM SETPOINT, the controller will display a message prompting the operator that the flow rate is too high. If the rate error is less than the alarm setpoint, the display will alarm that the flow rate is too low. Setting the FLOW RATE ALARM to ±0.0 GPM turns off the alarm feature. The RATE ERROR ALARM may also help indicate when the nurse tank is running low and the dip tube is allowing excessive vapor to flow through the meter. This is an indication that the tank is near empty and should be replaced or filled. The shutoff valve 59 is used downstream of the control valve for on/off control during vehicle turns in the field.

A control cable connects the controller to the flow meter and the control valve. Weatherproof connectors may be keyed so that they can only be connected to the correct devices. The controller can be up to 35 feet from the flow meter and control valve, and the control valve is mounted near the flow meter. The flow meter and the control valve are typically screwed together.

In a preferred embodiment, a variable area flow meter replaces the turbine meter discussed above. Variable area meters generally measure flow by keeping the pressure drop through the meter constant while an orifice area is varied to match the flow. A variable area meter as disclosed herein is not easily damaged by vapor flow, has few moving parts, and is simple to use and maintain. The variable area meter is also not affected by upstream piping effects as are turbine meters, which typically require a minimum of 10 times the inlet pipe diameter of straight pipe before the meter and 5 times the pipe diameter of straight pipe on the meter outlet. Variable area meters also tend to be self cleaning. The velocity of the flow past the vane of the variable area meter preferably used in this invention and the freedom of the vane to move within the meter housing to clean itself prevents buildup of foreign material. The variable area meter is thus used to determine mass flow rate (pounds/hour) of $NH_3$. Since the vane responds to changes in fluid density, the vane position in the meter will change with changing fluid density.

Figure 6:
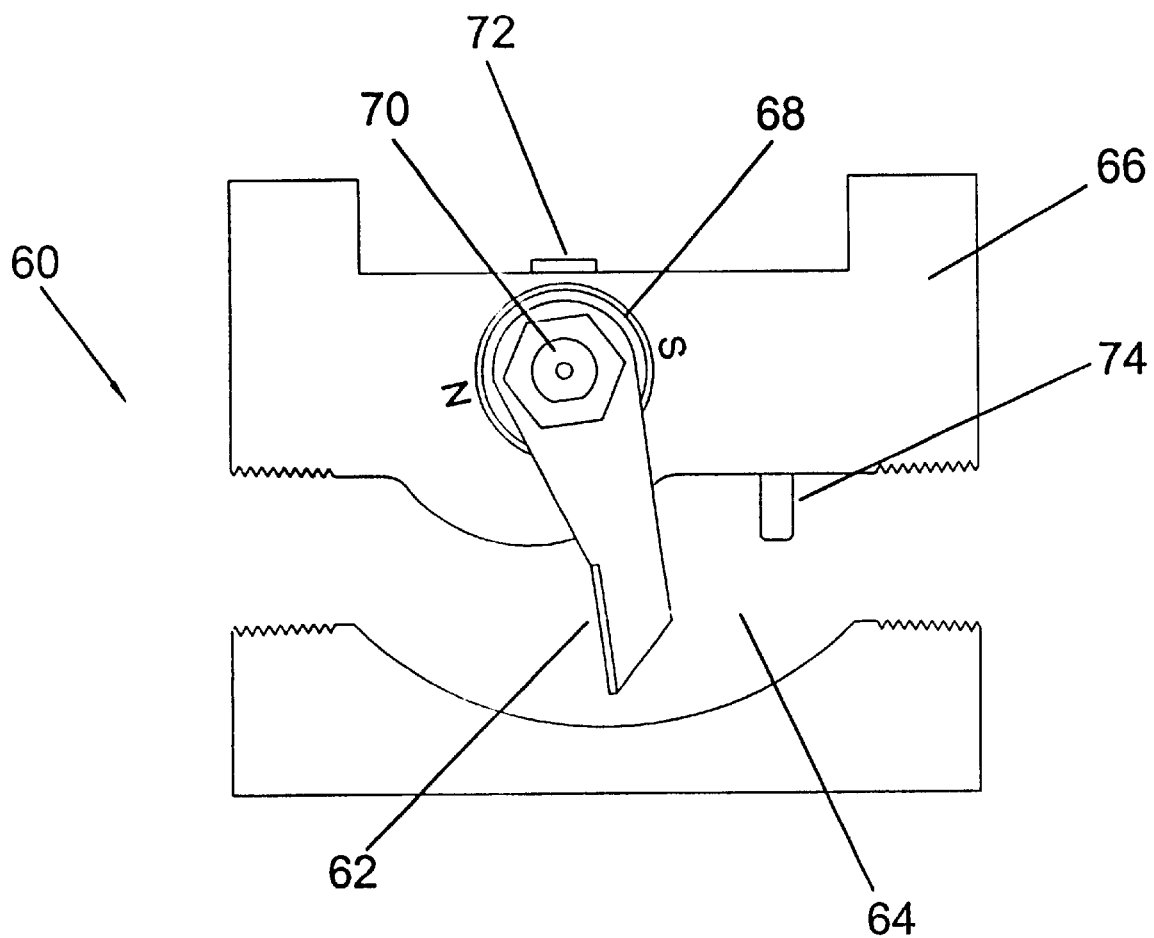
FIG. 6 is a simplified illustration of a variable area meter according to this invention.

A simplified variable area meter 60 according to the present invention is shown in FIG. 6. The orifice area is varied by moving a vane 62 through an internal cavity 64 within the meter, so that the cross-sectional flow area changes as a function of the vane position with respect to the meter housing 66. The position of the vane is directly related to the flow rate. One method for measuring the position of the vane is to extend the rotating shaft which is connected to the vane through a seal in the meter housing. The shaft may turn a potentiometer (not shown) or may be connected directly to a vane position indicator. A variable area flow meter could thus be equipped with such a potentiometer to measure shaft rotation and thus vane position, thereby providing a flow rate signal to the controller 13. Passing the meter shaft through a seal to exit the meter housing is undesirable, however, for both safety and reliability reasons, since ammonia gas is very corrosive and the seal life is low. The seal can also add friction to the rotating shaft, thereby introducing error to the flow reading. The pressure rating for this meter is also limited due to the shaft seal. High pressure, such as 400 psi commonly used for $NH_3$ applications, would be difficult to achieve with this type of meter.

Another possible variable area meter, which could eliminate the seal, would magnetically couple the vane through the meter housing. The magnets of the magnetic coupling technique may cause errors over time due to hysterisis. By incorporating a spring return feature with a magnetically coupled indicator, a flow meter more appropriate for $NH_3$ use is obtained. There still exists a problem of converting the measured position of the vane to an electrical signal for telemetry to a controller which regulates a flow meter. A proposed method for doing this is to use a potentiometer. A primary problem with a potentiometer is that it adds friction which causes error to the flow reading, since some amount of torque is required to move the potentiometer element. The potentiometer element also has a limited life since it wears during use. Another proposed method would be to use a Variable Displacement Transducer, or LVDT. This device uses a modulated transformer to detect position, adding no friction to the vane shaft due to its non-contact feature. An LVDT is very accurate and has long service life. LVDT transducers are, however, expensive and require complicated electronic processing and calibration. This technology would add significant cost to the system and would reduce reliability due to increased complexity. A simple, precise, non-contact sensor is thus preferred that will detect the vane position and output a signal indicative thereof to the controller.

To overcome these problems, a hall effect sensor is preferably used to measure the vane position in the meter housing. The hall effect sensor or transducer output is responsive to the rotational position of a magnet mounted on the same shaft. Rotation of the magnet alters the flux density and thus the sensor output by changing the resistance of the sensor. This technique eliminates both the seal and friction induced by a measuring transducer. A hall effect sensor thus produces a voltage output proportional to magnetic field strength. The field seen by the sensor becomes negative as it approaches the north pole, and more positive as it approaches the south pole. This type of sensor features mechanical simplicity.

A ceramic magnet 68 as shown in FIG. 6 is fitted on the vane shaft 70. The magnet may be fixed to the vane shaft 70 so that at half flow the hall effect sensor 72 is directly between the north and south poles of the magnet. The meter body 66 is designed to allow the vane 62 to rotate 90° from no-flow to full-flow. The output of the sensor 72 may be conditioned and transmitted back to the controller 13 as shown in FIG. 1 in a 4–20 ma format. The 4–20 milliamp format is popular in the industrial community due to its immunity to voltage cross-talk and changes in wire and connector resistance. The flow meter signal is converted to a voltage and is preferably digitized at the controller 13. The flow rate in GPM is calculated from the digitized voltage signal using an equation fitted to the characteristics of the meter housing, the vane and the spring force. FIG. 6 also shows a suitable position for a temperature sensor 74 to output a density correction signal to the controller 13. The sensor 74 is preferably positioned within the cavity 64 of the meter housing so that vaporization correction and density correction are made on substantially the same fluid as it passes through the meter.

The ring magnet 68 is magnetized across the vane shaft. As the magnet rotates, the gap between the magnet and the sensor 72 is kept constant, but a varying output is produced as a result of changing flux of the magnet based on its rotational position with respect to the sensor 72. This provides a non-intrusive method of accurately measuring the flow meter vane position through the meter housing without adding resistance to the vane shaft. The magnet may be formed from a ceramic or a rare earth material. The magnet has an arcuate body with an exterior surface defining a portion of a circle, thereby maintaining the desired constant gap between the magnet and the sensor 72. The meter housing 66 is designed to allow the vane 62 to rotate approximately 90° from no flow to full flow. The sensor 72 may be positioned to be in the center of the magnet poles at 50% flow.

Figure 7:
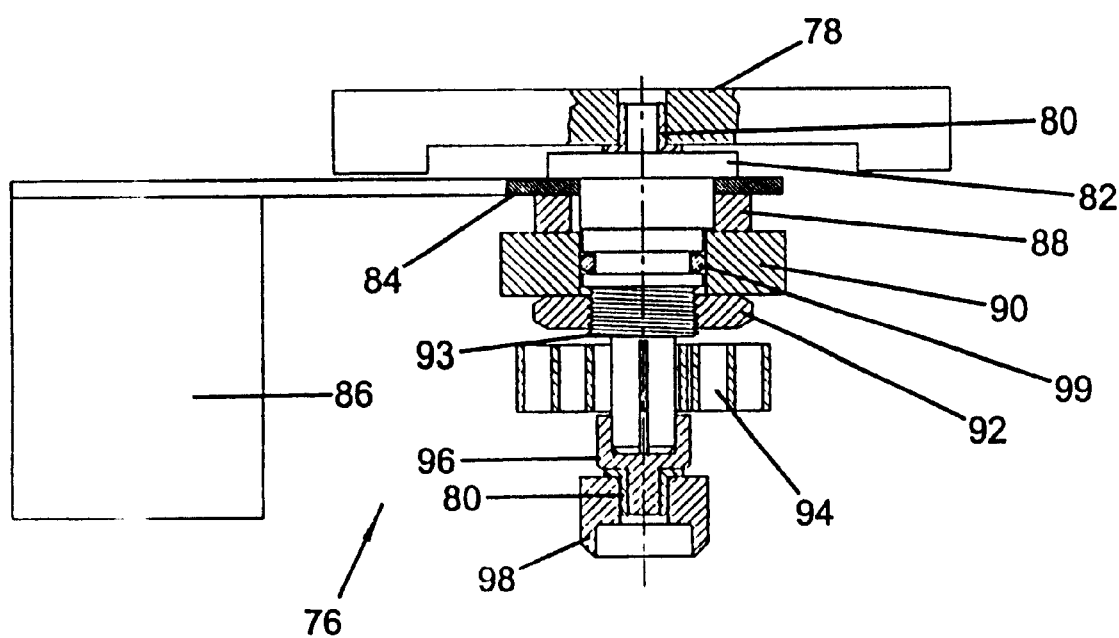
FIG. 7 is a side view, partially in cross-section, of a vane assembly for a suitable variable area flow meter according to the present invention.

FIG. 7 illustrates a preferred embodiment of a paddle shaft or vane assembly 76 for use in a variable area flow meter according to the present invention. Paddle shaft assembly 76 includes the bearing housing 78 and upper and lower plastic bearings 80 for guiding rotation of paddle shaft 82. Vane arm 84 is securely mounted on the shaft 82 and carries a paddle 86 which serves as the cross-sectional flow area defining member within the meter, as discussed above. A spacer 88 separates the arm 84 from the magnet 90, which is functionally and operationally the same as the magnet 68 shown in FIG. 6. A nut 92 secures the magnet 90 in place by engagement with a threaded portion 93 of the shaft 82. A coil spring 94 or other suitable biasing member is fixedly mounted on the paddle shaft for biasing the paddle 86 in the no flow position. The lower shaft bearing member 96 is provided at the lowermost end of the rotatable shaft 82, and plastic bearing 80 is provided between member 96 and the lowermost fitting 98. The fitting 98 may be sized for receipt within a suitable cavity in the meter housing, and another coil spring (not shown) may be used for exerting an upward force on the fitting 98 to retain the components in place. The conventional O-ring 99 is provided to center the magnet 90 on the shaft 82.

Figure 8:
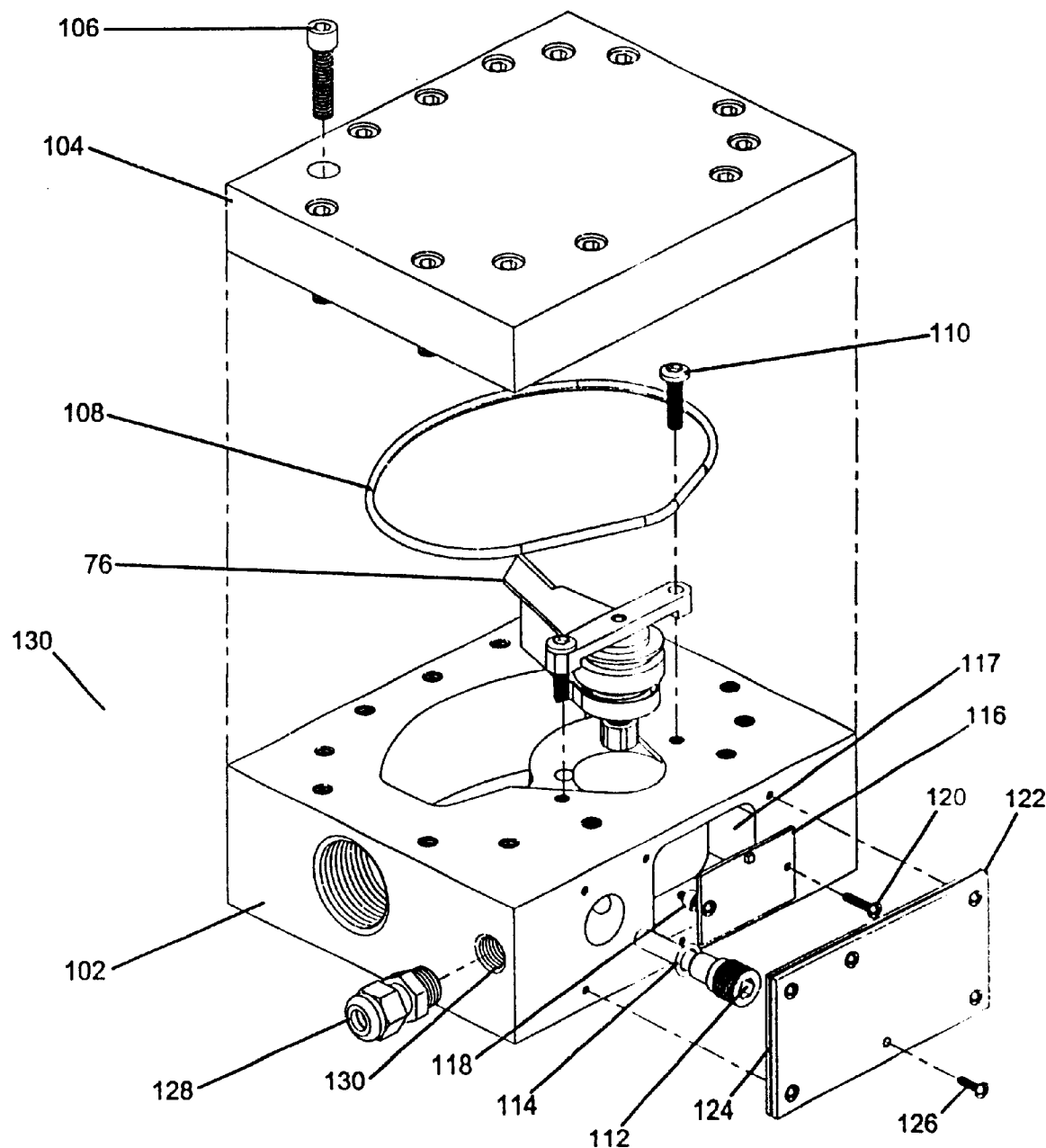
FIG. 8 is an exploded pictorial view of a preferred embodiment of a variable area meter generally shown in FIG. 6.

FIG. 8 illustrates a preferred embodiment of a variable area flow meter 130 according to the present invention, which includes the paddle shaft assembly 76 shown in FIG. 7. The variable area meter 130 includes a meter housing 102 and a cover plate 104 which are mechanically coupled by suitable bolt members 106. An O-ring 108 provides for sealed engagement between the housing 102 and the cover 104. A pair of screws 110 fix the bearing housing of the vane shaft assembly 76 to the meter housing 102.

A temperature probe assembly 112 is shown for sensing the temperature of the fluid as it passes through the internal cavity in the housing 102. O-ring 114 provides for sealed engagement between the probe assembly 112 and the housing 102. A PC circuit board 116 is sized to fit within cavity 117 in the housing 102, with a pair of nylon spacers 118 electrically isolating the circuit board 116 from the metal housing 102. The circuit board 116 may include one or more computer chips for performing the calculations discussed above, and for outputting appropriate display signals to the operator and control signals to the regulator. Circuit board 116 is retained in place by a pair of conventional screws 120. A cover plate 122 is mounted to the meter body 102 by screws 126, and an O-ring 124 provides for sealed engagement between the cover plate 122 and the body 102. A wire seal strain relief 128 is provided for fitting within port 130 in the body 102.

The ring magnet 68 provides a low cost and accurate method of measuring the vane position in the variable area meter. By not requiring shaft seals, the meter housing can be designed to withstand both corrosive or hostile fluids and high pressures. The vane shaft may easily rotate on two plastic bearings.

Figure 9:
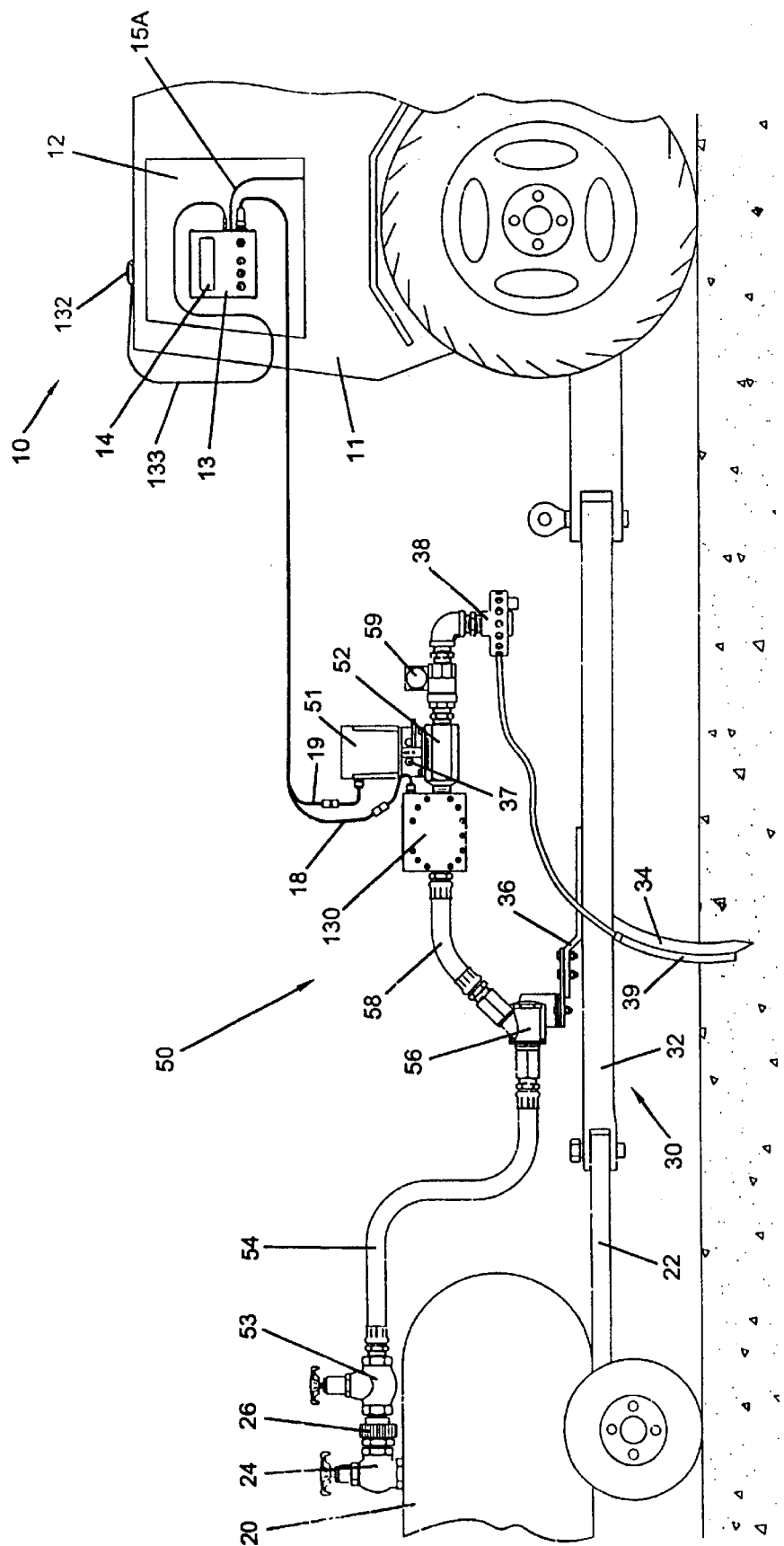
FIG. 9 is a schematic view of a preferred embodiment of an $NH_3$ distribution system according to the present invention.

The preferred variable area flow meter of this invention uses a unique non-intrusive and low cost method of measuring vane position which related to flow rate. The flow meter ideally meets the following requirements: (1) the flow meter is compatible with the corrosive properties of the fluid; (2) the meter is capable of surviving the high velocity vapor flow with no significant degradation to the meter performance; (3) the flow meter may be economically manufactured with a 400 psig pressure rating; (4) due to the flashing properties of liquid, there is a low differential pressure developed across the meter to minimize vapor; (5) the flow meter has excellent repeatability and low drift over a large operating temperature range; (6) contaminants in the fluid, such as rust or dirt, do not affect or degrade the performance of the meter; (7) the meter may easily monitor a flow range from 3 to 30 GPM of the measured liquid, such as anhydrous ammonia; and (8) the flow meter is simple to use, install and service. The variable area meter 60 as shown in FIGS. 8, 9 and 10 meets the above design requirements. The preferred flow meter improves reliability and safety over existing flow meters used in $NH_3$ distribution systems.

To compensate for the changing density of $NH_3$ with temperature, the meter 60 as shown in FIG. 6 is equipped with a digital temperature probe 74. The controller 13 reads the fluid temperature and applies a temperature correction algorithm to the measured flow. Temperature correction charts located in operation manuals may be used to enable the operator to determine the flow set point in gallons per minute. To make the system more friendly, the procedure to determine the desired flow rate is preferably automatically performed by the controller 13. The user enters the TOOL BAR WIDTH, TRACTOR SPEED, and DESIRED APPLICATION rate in pounds per acre. The computer within the controller 13 thus calculates the flow set point, first by making the temperature correction based on the sensed temperature, and then making the vaporization correction based on the system test discussed earlier. All values are saved in memory so if only one of the values (tractor speed for example) needs to be changed, the other values are already set. The measured flow is displayed along with the flow deviation (FLOW POINT minus SET POINT). this makes it easy to determine if the flow needs to be increased or decreased to maintain the desired application rate. A positive deviation indicates the flow rate is too high and the operator needs to make adjustments to the control valve 52.

A flow rate alarm feature may also be included, in the system of this invention. The flow deviation may be compared to an alarm set point. If the deviation is higher or lower than the alarm trigger setting for more than a preferred period of time, e.g., 5 seconds, a message will flash on the display indicating that the flow rate is either too high or too low. This prompts the operator to make adjustments to the rate control valve 52 using the flow adjustment switch 17 on the controller 13. A large deviation error could be an indication that the nurse tank is near empty, or that the flow meter is measuring excessive/no liquid vapor flow from the nurse tank.

FIG. 9 depicts a preferred embodiment on an $NH_3$ distribution system according to the present invention. Components similar to those depicted in FIG. 1 are labeled with the same reference numerals. Anhydrous ammonia flows from the tank 20 through the withdrawal valve 24, and then through a hose connection piece 26, ball valve 53 and flexible hose 54. Safety pull away coupler 56, such as that disclosed in U.S. Pat. No. 5,320,133 or pending application Ser. No. 09/016,505 filed Jan. 30, 1998, is mounted on the bracket 36 secured on the tool bar 30. Flexible flow line 58 extends from the safety pull away coupler 56 to the flow meter 130, with the control valve 52 operated by gear motor 51 being immediately downstream from the meter 130 which is mounted on bracket 37. Shut off valve 59 is provided in between the control valve 52 and the flow distributor manifold 38, and a representative flow tube 39 extends from the manifold 38 to each of the knives 34.

A controller 12 similar to that previously discussed is provided on the cab 11 of the vehicle. FIG. 9 shows a GPS antenna 132 connected to the controller 12 by line 133. If desired, the electronics for the GPS system may be included within the controller 12. A 12-volt DC power line 15A is provided from the vehicle battery (not shown) to power the controller. Line 19 extends from the controller to the gear motor 51 of the regulator 52, while line 18 extends from the flow meter 130 to the controller.

The present invention may be used to control flow in liquid systems other than anhydrous ammonia. Alternative liquids may include anhydrous ammonia and one or more other liquids. The method and apparatus disclosed herein are especially useful for controlling the flow of liquids which have a low boiling point. The system of the invention could also be used to control the distribution of herbicides, pestcides, or weed control liquids. The variable area flow meter may be used to measure the flow rate of various liquids in real time and thereby control the flow rate of the liquid through a flow line in real time. The meter is, however, particularly well suited for measuring the flow rate of a low temperature vaporization liquid, such as anhydrous ammonia, butane or propane.

The preferred embodiment of the invention has been shown and described above. It is to be understood that minor changes in the details, construction and arrangement of the partes and steps may be made without departing from the spirit or scope of the invention as described.

What is claimed is:

1. Apparatus for controlling the amount of $NH_3$ applied to a field from a nurse tank located on a vehicle, comprising:
   a control station on the vehicle for determining a ground speed of the vehicle;
   a flow meter downstream from the nurse tank for outputting a flow rate signal to the control station;
   a temperature sensor for sensing the temperature of the $NH_3$ and outputting a temperature signal to the control station;
   a flow distribution line downstream from the flow meter for channeling $NH_3$ to a tool bar connected to the vehicle;
   the control station including a correction device for correcting the flow rate signal from the meter to a corrected flow rate signal in response to a comparison of a measured total flow derived from the flow rate signal and an actual total flow, the control station outputting a control signal in response to the corrected flow rate signal and the temperature signal; and
   an adjusting valve for regulating the flow of $NH_3$ through the flow distribution line in response to the control signal.

2. The apparatus as defined in claim 1, wherein the flow meter comprises:
   a housing having an internal cavity with a fluid inlet and a fluid outlet;
   a vane member rotatable about a shaft axis and moveable within the internal cavity in the housing to vary the flow area as a function of the flow rate through the meter;
   a biasing member for biasing the vane member in a preselected position; and
   a sensor for outputting a signal indicative of the rotational position of the vane member and thus the flow rate through the housing.

3. The apparatus as defined in claim 2, wherein the flow meter further comprises:

a magnet fixedly positioned on the vane member within the cavity and rotatable within the vane member about a shaft axis; and
   the sensor is a hall effect sensor having an electrical output responsive to the flux of the magnet which varies with the rotational position of the magnet within the cavity.

4. The apparatus as defined in claim 1, further comprising:
   a withdrawal valve positioned between the nurse tank and the flow meter.

5. The apparatus as defined in claim 1, further comprising:
   a withdrawal valve, a connector, a flexible hose and a ball valve each positioned between the nurse tank and the flow meter.

6. Apparatus for controlling the amount of fluid applied to a field from a nurse tank located on a vehicle, comprising:
   a control station for determining a ground speed of the vehicle;
   a flow meter downstream from the nurse tank for outputting a flow rate signal to the control station;
   the control station including a correction device for correcting the flow rate signal from the flow meter to a corrected flow rate signal in response to a comparision of a measured total flow derived from the flow rate signal and an actual total flow and outputting a control signal in response to the corrected flow rate signal; and
   an adjusting valve for regulating the flow of fluid through the flow distribution line in response to the control signal.

7. The apparatus as defined in claim 6, wherein the flow meter comprises:
   a housing having an internal cavity with a fluid inlet and fluid outlet;
   a vane member rotatable about a shaft axis and moveable within the internal cavity in the housing to vary the flow area as a function of the flow rate through the meter;
   a biasing member for biasing the vane member in a preselected position; and
   a sensor for outputting a signal indicative of the rotational position of the vane member and thus the flow rate through the housing.

8. The apparatus as defined in claim 7, wherein the flow meter further comprises:
   a magnet fixedly positioned on the vane member within the cavity and rotatable within the vane member about a shaft axis; and
   the sensor is a hall effect sensor having an electrical output responsive to the flux of the magnet which varies with the rotational position of the magnet within the cavity.

9. The apparatus as defined in claim 6, further comprising:
   a withdrawal valve positioned between the nurse tank and the flow meter.

10. The apparatus as defined in claim 6, further comprising:
    a withdrawal valve, a connector, a flexible hose and a ball valve each positioned between the nurse tank and the flow meter.

11. The apparatus as defined in claim 6, further comprising:
   a flow distribution line downstream from the flow meter for channeling the fluid to a tool bar.

12. The apparatus as defined in claim 6, wherein the control station is positioned on the vehicle.

13. The apparatus as defined in claim 6, further comprising:

a temperature sensor for sensing the temperature of the fluid and outputting a temperature signal to the control station;

the correction device is responsive to the temperature signal when outputting the control signal.

\* \* \* \* \*

UNITED STATES PATENT AND TRADEMARK OFFICE
CERTIFICATE OF CORRECTION

| | | |
|---|---|---|
| PATENT NO. | : 6,422,162 B1 | Page 1 of 1 |
| APPLICATION NO. | : 09/576629 | |
| DATED | : July 23, 2002 | |
| INVENTOR(S) | : Spencer Nimberger and Kevin Cessac | |

It is certified that error appears in the above-identified patent and that said Letters Patent is hereby corrected as shown below:

On the title page, in column 1, item (62), "Division of application No. 09/087,515, filed on May 29, 1998, now Pat. No. 6,343,318." should be changed to --Division of application No. 09/087,516, filed on May 29, 1998, now Pat. No. 6,067,917--.

Signed and Sealed this
Twenty-eighth Day of May, 2013

Teresa Stanek Rea
*Acting Director of the United States Patent and Trademark Office*